United States Patent [19]
Reinhardt

[11] Patent Number: 6,153,054
[45] Date of Patent: Nov. 28, 2000

[54] RAW RELEASE PAPERS WITH PIGMENT STRIPS BASED ON ALUMINIUM HYDROXIDES

[75] Inventor: Bernd Reinhardt, Osnabruck, Germany

[73] Assignee: Kämmerer GmbH, Osnabrük, Germany

[21] Appl. No.: 08/930,682

[22] PCT Filed: Mar. 26, 1996

[86] PCT No.: PCT/EP96/01319

§ 371 Date: Mar. 24, 1998

§ 102(e) Date: Mar. 24, 1998

[87] PCT Pub. No.: WO96/31651

PCT Pub. Date: Oct. 10, 1996

[30] Foreign Application Priority Data

Apr. 5, 1995 [DE] Germany .......................... 195 12 663

[51] Int. Cl.$^7$ .................................................. D21H 19/38

[52] U.S. Cl. ................... 162/135; 162/164.4; 162/181.4; 162/181.5

[58] Field of Search ..................................... 162/135, 128, 162/127, 181.4, 181.5, 164.4; 428/341, 343, 352, 449

[56] References Cited

U.S. PATENT DOCUMENTS 5,635,291  6/1997  Yoshino et al. ...................... 428/304.4

*Primary Examiner*—Peter Chin
*Attorney, Agent, or Firm*—Amster, Rothstein & Ebenstein

[57] ABSTRACT

Raw release paper for coating with a layer of dehesive silicone, in which case a pigment coating containing a binder is formed on the paper, exhibits aluminum hydroxide as the sole pigment or a pigment mixture with aluminum hydroxide as the main component.

10 Claims, No Drawings

RAW RELEASE PAPERS WITH PIGMENT STRIPS BASED ON ALUMINIUM HYDROXIDES

Conventional pigment-coated raw release papers exhibit a layer of pigment/binder mixtures on one or both sides, clay (kaolin), talc or calcium carbonate being used as pigments, separately or in combination, and chiefly polymer dispersions as binders, frequently in a mixture with modified starch products. The superior smoothability and thus higher surface density permit lamelliform pigments such as clay or even, to a limited extent, talc.

In general, these pigment-coated raw release papers are designated as "clay-coated papers", which is already an indication of the coating pigment primarily used (*Coating*, 1987, 10:366–372, and 11:396–398).

Compared with unpigmented paper coatings, these paper qualities exhibit economic and qualitative advantages, such as superior smoothability reduced porosity reduced coating roughness higher surface density higher luster increased "silicone hold out"

and thus a partially reduced use of silicone for the achievement of a largely closed silicone film with greater dehesive action.

More recent developments in the field of coating technology, which are based upon the direct or indirect film-transfer technique, already permit the application of thin pigment coatings of less than 5 g/m² (solid) to the raw paper, within the paper machine. Primarily used for this on-line pigmentation are roller application plants with volumetric premetering (gate-roll and blade-metering film presses or blade-application aggregates with a premetering unit: High special-metering dosage technique, such as Bill-blade HSM, LAS, HSM and twin-HSM) (see *Das Papier* [Paper], 1991, 10A:120–124, *Wochenblatt für Papierfabrikation* [Paper Production Weekly] 1993, 10:390–393, and 1994, 17:671–676).

The purpose of these coatings is primarily to improve the printability of the paper, especially when offset printing is used.

This new application technology, also frequently termed thin-coating technology, is therefore likewise used for the production of pigment-coated raw release papers with thin coatings.

In contrast to the fields of application known thus far, in which the emphasis is generally upon printability by controlled adjustment of the coating porosity and the capacity of the paper to absorb coatings, the focal point is now the achievement of a largely closed paper surface with the thinnest possible coating application. Only thus, as in the case of the already mentioned classical "clay-coated" raw release papers with a frequently higher application, can the penetration tendency of silicone resins during subsequent coating to form release papers be kept within limits.

Pigment-coated raw release papers, produced using thin-coating technology, with applied coatings of approximately 5 g/m² (solid) have been produced since 1994. Used as pigments are primarily special clay mixtures with a defined particle-size distribution and the most pronounced lamelliform structure possible. There has also been no lack of attempts to employ the likewise lamelliform talc or calcium carbonate as a coating pigment. The last-named pigment does not however adequately satisfy the imposed requirements with regard to surface density and transparency due to its bead structure and is for that reason used mostly only in combination with clay or talc.

During the coating of raw release papers with silicone resins to produce release papers, the highest demands are imposed upon the silicone coating, because otherwise unacceptably high deviations in the releasing behavior of the silicone-treated papers results, and thus for example disturbances during the labeling process. The uniformity of the applied silicon coating is ordinarily determined by x-ray fluorescence measurement of the silicon as the principal component of a silicone resin, the penetration of the x-rays into the thickness of the paper being limited to approximately 5 $\mu$m.

Clay (natural aluminum silicate) or talc (natural magnesium silicate), significantly disturbs however the exact determination of the application weight of the silicone due to their silicon content or, in the case of classic "clay-coated" raw release papers, make pigment-coating applications in excess of 5 g/m² (solid) impossible.

In the latter case, only the volumetric measurement of the use of silicone remains for the most part over a relatively long production run, which however permits no conclusion with regard to the uniformity of the silicone application in the lengthwise and crosswise direction of the paper.

Coating-weight deviations of from up to ±0.3 g/m² to as much as ±0.5 g/m² can occur in the case of pigment-coated raw release papers with a coating application of less than 5 g/m², which have a very disturbing effect upon an exact silicone-application determination via x-ray fluorescence measurement already in the range of conventional silicone applications of from 0.5 to 0.8 g/m² with the use of solvent-containing silicone resins, or of from 0.8 to 1.2 g/m² when solvent-free silicone resins are used.

That is one of the reasons why raw release papers with coating applications of less than 8 g/m², mostly less than 5 g/m², with clay or talc as the base pigment find either no or only very delayed application in practice.

A further reason is the disturbing influence of permanent alkali in the pigment coating upon the anchoring and cross-linking of the silicone, particularly with relatively long-term storage of the composite material (combination of silicone-treated base paper and adhesive-coated overlay paper, for example, labels), which is generally termed "post rub off" among professionals in the field.

Used however for the complete dispersion and stabilization of coating pigments in water and thus to produce the desired low viscosity of the coating composition is chiefly caustic soda solution in combination with special dispersing agents.

JP 49/132,305 a describes a printing paper with a high degree of luster and good sliding properties, which contains on the base paper, per one execution variant, an undercoat consisting of 20 parts of kaolin, 80 parts of aluminum hydroxide and 30 parts of milk casein and, over the latter, an upper layer consisting of 70 parts of kaolin, 30 parts of polystyrene and 20 parts of styrene/butadiene-latex. This two-layered structure is necessary to obtain the required degree of luster and the desired sliding properties.

The problem addressed by the invention is therefore to produce pigment-coated raw release papers with the thinnest possible coating applications, which exhibit no silicone anchoring and silicone cross-linking ("post rub off") disturbances, no impairment of the silicon determination using x-ray fluorescent measurement and which likewise satisfy the high requirements relative to closure of the coating surface and thus low "silicone hold out".

This goal is achieved by a raw release paper for coating with a dehesive silicone layer, in which case a pigment coating consisting of aluminum hydroxide alone or as a main component in the case of pigment mixtures is formed upon the paper.

Aluminum hydroxides are lamelliform pigments which, in comparison with the conventionally employed coating pigments, can impair the processability of coating compositions at relatively high concentrations and relatively high content percentages of binding agents. It was therefore surprising that surface densities of the invented pigment-coated raw release papers equal to or even slightly better in comparison with those with clay or talc as sole coating pigments, with simultaneously better adhesion of the subsequent silicone coatings, were achieved. Significant improvements in the "silicone hold out" and thus in the silicone requirement for the achievement of specified releasing properties of the silicone-treated paper were then however achieved after silicone coating. Moreover, raw release papers treated with 100% of aluminum hydroxide exhibit no anchoring or cross-linking disturbances ("post rub off") of the silicone film during a storage period extending over several weeks.

The pigment coating contains a binding agent. Suitable binding agents are all the water-soluble polymers known to paper-coating technology, such as starch derivatives, carboxymethylcellulose or polyvinyl alcohols and aqueous polymer dispersions (lattices) based upon acrylic acid, acrylic acid esters, acrylonitrile, vinyl acetate, butadiene or styrene, separately or in mixtures. Binders or binding-agent mixtures are available in the pigment coating in a pigment/binder-ratio of from 1:0.25 to 1:2.3, preferably from 1:0.3 to 1:2.0 and most preferably from 1:0.35 to 1:0.45 (calculated in terms of solids, i.e. relative to the weight of solid substance).

According to a preferred execution variant, the pigment coating is formed on the raw release paper in an amount of from 1 to 20 $g/m^2$, preferably from 3 to 10 $g/m^2$. The pigment coating can be formed on a surface-sized paper, but also on a paper without surface sizing. It can be applied in one or two process steps, to one or both sides of the paper.

The invented release paper contains, in the above-described pigment coating, an application of silicone preferably in the amount of from 0.9 to 1.0 $g/m^2$. The dehesive properties are imparted by the silicone coating.

Suitable organic silicone polymers with dehesive properties are known to the specialist; they include, for example, dimethylpolysiloxanes in chain form with terminal hydroxyl groups, which are condensed with silicic acid esters by the action of increased temperature and in the presence of organotin salts as a catalyst, or obtained via addition cross-linking by the reaction of polymers in chain form with vinylidene groups, under the effect of heat in the presence of platinum catalysts, with hydrogen siloxanes. The application methods already mentioned can be used for coating the raw release paper.

The invention will now be explained in detail in terms of examples.

EXAMPLE 1

Selection of Pigment-Binder Combinations

Coating Composition Preparation

Clay mixtures of defined particle size had been effective in practice, due to their pronounced hexagonal lamellar structure, as known clay coating pigments suitable for producing a largely closed coating surface.

Selected for comparison tests, as typical representatives of the likewise lamellar aluminum hydroxide ($Al(OH)_3$)-pigments, were the commercially available types I and II, which are clearly different with regard to their particle-sized distribution and their specific surface. A comparison of the properties of these coating pigments is made in Table 1.

Chosen for the preparation of the coating compositions was a pigment/binder ratio of 1:0.44 (solid), where nearly all hollow spaces in the clay matrix are filled with binding agent. This so-called critical pigment-volume concentration (CPVC) was determined by means of the oil number in g of linseed oil/100 g of pigment, a method common in the lacquer industry for determination of the binder requirement in question. The CPVC accordingly defines the maximum possible packing density of a pigment. The $Al(OH)_3$-pigments used exhibit however a lower oil number than the clay mixture per Table 1. In other words, at the chosen pigment/binder ratio of 1:0.44 (solid), a film pigmented with $Al(OH)_3$ is present subcritically, in which all the hollow spaces of the pigment matrix are filled. These differences in the oil number and thus in the CPVC between the two pigment types lead one to anticipate binding-agent savings with the use of $Al(OH)_3$.

Employed for the preparation of the coating compositions were the binding agents listed in Table 2, the cationic starch (starch A) as a binding-agent component already having been found to be particularly suitable in practical tests with clay mixtures. The use of an anionic starch (starch B) in a clay coating composition results of course in a clear reduction in viscosity, though the storage stability (viscosity difference between immediate determination and measurement after 24 hours) is less favorable.

Aluminum hydroxide pigments exhibit on the other hand, surprisingly, a completely different behavior in such coating compositions. The replacement of the cationic starch (starch A) with the anionic starch (starch B) clearly increases the viscosity of the coating composition, with simultaneously improved water-retention capacity (WRC). Lower WRC values in $g/m^2$ or high WRC values in s indicate an improved retentive capability of the coating composition during surface application to paper and thus a reduced penetration of water and binding agent into the raw paper.

The closure of the coated surface is thus increased, with application of the same quantity of binding agent.

For the following coating tests, therefore, the anionic starch (starch B) was employed with Al(OH)$_3$ as a sole coating pigment, the cationic starch (starch A), on the other hand, with the use of clay. That was the provided the prerequisite for the use of Al(OH)$_3$ as the sole coating pigment.

The solid substance content of these coating compositions amounted to 45%, at which a good coated paper still resulted on the raw paper.

EXAMPLE 2

Coating compositions having the composition per Table 3 were applied to a raw paper without surface sizing, with a surface-related mass of 62 g/m$^2$, by means of a laboratory blade-applicator unit. The coating application (solid) amounted to 3 and 5 g/m$^2$.

In comparison with clay coating compositions, the use of Al(OH)$_3$ of type II, per Table 1, as a representative of the Al(OH)$_3$-types leads to a somewhat more open coating surface (higher SCAN porosity, greater oil absorption), but to a somewhat reduced microroughness.

The lower luster value with the use of Al(OH)$_3$ as the sole coating pigment points to a not so developed lamellar structure and thus not so favorable orientation of the pigments in a plane parallel to the paper plane, under the influence of glazing.

Essentially, this test however provided the proof that Al(OH)$_3$ can be used in pigmented coating compositions for raw release papers with good results.

EXAMPLE 3

A raw release paper without surface sizing and having a surface weight of 62 g/m$^2$, per Example 2, was treated with coating compositions containing clay and Al(OH)$_3$ per Table 4. The supplementary use of a mixture of Al(OH)$_3$, types I and II, per Table 1 produced an increase in the water-retaining capacity of the coating composition.

With a machine speed of 600 m/min., 3 or 5 g/m$^2$ (solid) of the coating compositions were applied to one side using a film press and the paper, thus pigment coated, glazed.

As documented by the results in Table 5, the paper characteristics (oil absorption, color bleeding, penetration) obtained were equal to (smoothness, microscopic roughness) or even better than those obtained with clay. Merely the coating luster was somewhat higher with the use of clay, which can be explained in turn by the less developed lamellar structure of the Al(OH)$_3$ pigments. These results permit the conclusion that Al(OH)$_3$ coating pigments can also be used alone in coating compositions and paper characteristics obtained comparable to those with clay coating pigments.

EXAMPLE 4

On a paper machine with a built-in film press, raw release papers of from 60 to 62 g/m$^2$ were surface-sized or pigment-coated on one side at a machine speed of approximately 550 m/min. The back side was coated uniformly (approximately 1 g/m$^2$, solids) with a starch solution. The coating-composition formulations are listed in Table 4. The raw release papers with finished surfaces were then premoistened to approximately 12% under ordinary conditions of practice and then submitted to a glazing treatment in a 16-roller supercalender.

Compared with highly glazed surface-sized raw release paper of the glassine type, the pigment-coated papers exhibit better surface characteristics. This is true in particular with regard to smoothness, luster, microscopic roughness and oil absorption. The microporosity, too, is reduced by the pigmentation, as the results in Table 6 show.

Surprisingly, the Al(OH)$_3$ shows advantages over clay, whenever optimal glazing conditions prevail. This is true in particular of the coating luster.

EXAMPLE 5

The papers from practice per Table 6 were coated with the use of a 5-roller application unit (with a solvent-free (LF) silicon system) or an accumulation-engraving roller application unit (with silicone emulsion) at a machine speed of 150 m/minute. The clay-coated paper was used only in one case (LF I-silicone system) as a reference sample. There were already sufficient statistically assured results available that with clay-coated raw release papers a maximally from 10 to 15% saving in silicone is possible in comparison with glassine papers, with comparable dehesive action. The silicone coating thereby varied between 0.5 and 1.0 g/m$^2$ (solid). The closure of the applied silicone films was determined by means of a methylene-blue dye test. The lower the color index, the more closed the formed silicone film and thus the greater the releasing effect with regard to adhesives. The results are presented in Table 7.

With an approximately comparable silicone application of from 0.8 to 0.9 g/m$^2$, the color grades determined—with the exception papers treated with silicone emulsion—were significantly lower on the pigment-coated papers. Luster and microroughness are significantly better for the pigment-coated raw release papers.

A comparison of the clay- and Al(OH)$_3$-coated raw release papers, with a 0.6 g/m$^2$ silicone coating (LF-silicone system I) exhibits clear advantages for Al(OH)$_3$ relative to color grades.

Let reference be made once more to the problems with the absolute determination of the silicone application via the conventionally employed x-ray fluorescence measurement in the case of clay-coated papers.

Whereas pigment coatings of from 3 to 5 g/m$^2$ with the use of clay exhibit a "background noise" on the web, not treated with silicone, of approximately from 0.9 to 1.3 g/m$^2$ of silicon, with deviations of up to from ±0.10 to 0.15 g/m$^2$, over the lengthwise and crosswise contour of the paper web, the "background noise", can be completely suppressed with the use of Al(OH)$_3$-coating pigments. To achieve that it is merely necessary to use a tube unit of the type ever more frequently employed today instead of an isotopene unit and to narrow the measurement width (window) to 1.65–1.85 keV instead of the otherwise common 1.506–1.978 keV.

Thus the person applying the silicone coating is provided with the possibility for an exact, absolute measurement of the silicone coating and of the fluctuations in the coating and thus the possibility of better prediction or control of the dehesive properties of those papers thus coated with pigment and treated with silicone.

In the case of clay-coated papers it is however necessary for determination of the silicone applied to the paper to be effected by means of a difference measurement (subtraction of the "background noise"), as it likewise takes place in our cases (Tables 7 and 8).

The raw release papers treated with $Al(OH)_3$ per the invention exhibit clear advantages with regard to the dehesive properties after silicone treatment, also in comparison with the clay-coated reference paper, as seen in Table 8.

The results of low-speed separation-force measurements with test adhesive strips have greater predictive value, according to common experience, than high-speed measurements. This is particularly true when difference measurements are to be made between different silicone surfaces.

Already at the approximately comparable silicone application of from 0.8 to 0.9 $g/m^2$, the invented $Al(OH)_3$-coated papers show clearly lower release values, independently of the silicone system used.

Even at the lowest LF-silicone application of 0.55 $g/m^2$, releasing forces are set, which are still lower than those with the silicon-coating quantities of from 0.9 to 1.0 $g/m^2$ common in the case of standard glassine papers. Computed from that are reductions in the applied silicone coating of at least 30%, with a comparable level of releasing force. No adhesion or cross-linking problems of the silicone film were observed on raw release papers coated with $Al(OH)_3$-pigment.

The clay-coated reference paper did not achieve these surprisingly good results of $Al(OH)_3$ coatings.

The silicone savings with the use of the invented Al(OH)$_3$-coated papers largely offset the higher pigment costs in comparison with clay.

The great possibilities for binding-agent reduction up to the achievement of the CPVC in the $Al(OH)_3$-pigment matrix were not yet taken into consideration in that case.

TABLE 1

COMPARISON OF SELECTED COATING PIGMENTS

| Pigment properties | Clay mixture | Al(OH)$_3$ I | Al(OH)$_3$ II | Al(OH)$_3$ Mixture |
|---|---|---|---|---|
| Solid substance content, % | 68.3 | 65.9 | 67.5 | 66.1 |
| pH | 7.4 | 10.0 | 9.1 | 6.9 |
| Brookfield viscosity, mPA · s (100 rpm, 20° C.) | 390 | 600 | 850 | 93 |
| Particle-size distribution (Sedigraph), % | | | | |
| <2 μm | 81 | 99 | 89 | 93 |
| <0.2 μm | 25 | 19 | 4 | 13 |
| Average particle diameter, μm | 0.49 | 0.47 | 0.88 | 0.66 |
| Specific surface (BET), m$^2$/g | 15.6 | 14.4 | 6.3 | 8.4 |
| Oil number g/100 g | 43 | 36 | 34 | 35 |
| Lamellar shape | | Pseudo Hexagonal | | |

TABLE 2

COMPARISON OF LABORATORY COATING COMPOSITIONS WITH DIFFERENT PIGMENTS AND STARCH BINDERS
Laboratory tests Binding agents: 25.5 parts (solid) of styrene-butadiene latex
16.0 parts (solid) of modified starches
(A - cationic, B - anionic)
2.5 parts (solid) of carboxymethylcellulose

| Properties of the coating compositions | Clay mixture | | Al(OH)$_3$ II | |
|---|---|---|---|---|
| | Starch A | Starch B | Starch A | Starch B |
| Solid substance content, % | 40.3 | 39.8 | 40.5 | 40.2 |
| pH | 7.8 | 8.3 | 8.5 | 8.3 |
| Water-retaining capacity under pressure, g/m$^2$ | 93.5 | 78.5 | 69.0 | 43.5 |
| static, s | 84 | — | 3 | 30 |
| Brookfield viscosity, mPa · s (100 rpm, 40° C.) | | | | |
| immediately | 2240 | 1260 | 490 | 840 |
| after 24 hours of storage | 2480 | 1900 | 470 | 1450 |
| Haaske viscosity, mPa · s (D = 10$^4$ · s$^{-1}$, 30° C.) | | | | |
| immediately | 33.77 | 22.79 | 17.45 | 25.10 |
| after 24 h in storage | 36.58 | 56.18 | 21.39 | 28.14 |

TABLE 3

COMPARISON OF RAW RELEASE PAPERS COATED ON ONE SIDE
Laboratory tests

Coating compositions: Solid-substance content 45%
pH 8.5
Pigment/binding agent ratio 1:0.44 (solid)

| Paper characteristics (raw paper, 62 g/m$^2$) | Clay mixture | | Al(OH)$_3$, II | |
|---|---|---|---|---|
| Coating applied, g/m$^2$ | ca. 3 | ca. 5 | ca. 3 | ca. 5 |
| Transparency, % | | | | |
| unglazed | 30.4 | 30.3 | 28.1 | 28.4 |
| glazed | 35.8 | 35.8 | 34.3 | 34.9 |
| Microroughness (PPS), μm | | | | |
| unglazed | 8.42 | 8.34 | 8.31 | 7.93 |
| glazed | 1.96 | 1.85 | 1.87 | 1.83 |
| Luster (75°), % glazed | 37.4 | 44.3 | 33.3 | 37.2 |
| SCAN porosity, cm$^3$/m$^2$ · s | | | | |
| unglazed | 1210 | 113 | 3210 | 1000 |
| glazed | 246 | 27 | 642 | 203 |
| Oil absorption, g/m$^2$ | | | | |
| unglazed | 3.26 | 11.5 | 10.40 | 2.73 |
| glazed | 0.79 | 0.15 | 2.49 | 0.75 |

TABLE 3-continued

COMPARISON OF RAW RELEASE PAPERS COATED ON ONE SIDE
Laboratory tests

Penetration, s

| | | | | |
|---|---|---|---|---|
| unglazed | 137 | 140 | 141 | 138 |
| glazed | 119 | 120 | 115 | 118 |

TABLE 4

COMPARISON OF LABORATORY COATING COMPOSITIONS WITH DIFFERENT PIGMENTS AND STARCH BINDERS
Technical tests Binding agents: 25.5 parts (solid) of styrene-butadiene latex
16.0 parts (solid) of modified starches
(A - cationic, B - anionic)
2.5 parts (solid) of carboxymethylcellulose

| Properties of the coating compositions | Clay mixture Starch A | Al(OH)$_3$ II Starch B | Al(OH)$_3$-mixture, (I/II = 50/50%) Starch B |
|---|---|---|---|
| Solid-substance content, % | 43.0 | 41.9 | 43.5 |
| pH | 8.1 | 8.1 | 7.7 |
| Brookfield viscosity, mPa · s (100 rpm, spindle, 30° C.) | 1770 | 1630 | 1450 |
| Haaske viscosity, mPa · s (RV 3, 30° C.) | 21.0 | 20.4 | 25.8 |
| Water-retaining capacity, s (pressure penetration) | Not measurable | 680 | 1075 |

TABLE 5

COMPARISON OF RAW RELEASE PAPERS COATED ON ONE SIDE UNDER DIFFERENT GLAZING CONDITIONS
Technical tests
Pigment-binder ratio 1:0.43

| Paper characteristics (raw paper, 62 g/m²) | Clay mixture | | Al(OH)$_3$ I | | Al(OH)$_3$-mixture, (I/II = 50/50%) | |
|---|---|---|---|---|---|---|
| Coating layer, g/m² | 3 | 5 | 3 | 5 | 3 | 5 |
| Smoothness per Bekk, s | | | | | | |
| TG | 280 | 470 | 270 | 410 | 410 | 400 |
| LG | 1210 | 1740 | 1330 | 1310 | 1610 | 1470 |
| Microroughness (PPS), μm | | | | | | |
| UG | 8.8 | 8.3 | 8.5 | 8.5 | 8.1 | 8.5 |
| TG | | 2.6 | 3.1 | 2.7 | 2.7 | 2.7 |
| LG | 2.1 | 1.9 | 2.0 | 2.0 | 1.9 | 1.9 |
| Luster (75°), % | | | | | | |
| TG | 7 | 12 | 6 | 9 | 7 | 7 |
| LG | 13 | 18 | 13 | 14 | 13 | 14 |
| Oil absorption, g/m² | | | | | | |
| UG | 4.9 | 1.2 | 3.2 | 1.4 | 1.9 | 1.4 |
| TG | 1.6 | 0.4 | 1.5 | 0.6 | 0.7 | 0.7 |
| LG | 0.8 | 0.3 | 0.7 | 0.4 | 0.4 | 0.4 |
| Color bleeding, (LH) Grade 1 - None Grade 6 - Great | 6 | 2 | 5 | 3 | 4 | 2 |
| Penetration, s | | | | | | |
| TG | 8 | 20 | 18 | 35 | 28 | 34 |
| LG | 11 | 19 | 19 | 47 | 34 | 42 |

Glazing:

TABLE 5-continued

COMPARISON OF RAW RELEASE PAPERS COATED ON ONE SIDE UNDER DIFFERENT GLAZING CONDITIONS
Technical tests
Pigment-binder ratio 1:0.43

| Paper characteristics (raw paper, 62 g/m²) | Clay mixture | | Al(OH)$_3$ I | | Al(OH)$_3$-mixture, (I/II = 50/50%) | |
|---|---|---|---|---|---|---|
| Coating layer, g/m² | 3 | 5 | 3 | 5 | 3 | 5 |

UG - Unglazed
TG - Technical glazing (10 roller supercalender), 6% premoistening, 220 kN/m, 90° C., 400 m/min
LG - Laboratory glazing (2-roller calender) 7% premoistening, 100° C.

TABLE 6

COMPARISON OF RAW RELEASE PAPERS COATED ON ONE SIDE (GLAZED)
Practical tests Glazing: 16-Roller supercalender, Premoistening at about 12% 340 kN/m, 140° C., 410 m/min

| Paper characteristics | Surface-sized (standard), glassine type | Pigment-coated, pigment/binder ratio 1:0.44 (solid) Clay mixture | Al(OH)$_3$-mixture (I/II = 50/50%) |
|---|---|---|---|
| Surface-related mass, g/m² | 62 | 62 | 60 |
| Coating layer, g/m² (upper side) | about 1 | about 6 | about 6 |
| Raw density, g/cm³ | 1.11 | 1.13 | 1.15 |
| Transparency, % | 45 | 45 | 45 |
| Smoothness per Bekk, s | | | |
| US | 1300 | 2500 | 2500 |
| SS | 500 | 600 | 400 |
| Luster (75°), % | 45.8 | 52.0 | 55.3 |
| Microroughness (PPS), μm | 1.9 | 1.7 | 1.6 |
| SCAN-porosity, cm³/m² · s | 60 | 20 | 30 |
| Oil absorption, g/m² (OS) | 1.0 | 0.4 | 0.4 |

US - Upper side
SS - Sieve side

TABLE 7

COMPARISON OF SILICONE-TREATED RAW RELEASE PAPERS

| Paper (62 g/m²) | Silicone system | Silicone layer g/m² | Luster (75°) % | Microroughness (PPS) μm | Color index, ΔY (methylene blue, 60 s) |
|---|---|---|---|---|---|
| A (Standard) | Emulsion (11.6%) | 0.96 | 24.0 | 2.14 | 10.5 |
| B | | 0.89 | 37.1 | 1.55 | 13.8 |
| | | 0.73 | 35.1 | 1.66 | 15.4 |
| A (Standard) | SF I | 0.80 | 38.7 | 1.71 | 12.0 |
| B | | 0.91 | 51.1 | 1.35 | 2.1 |
| | | 0.69 | 47.3 | 1.38 | 2.6 |
| | | 0.55 | 43.8 | 1.74 | 4.1 |
| C | | 0.60 | 40.5 | 1.40 | 11.9 |
| A (Standard) | SF II | 0.82 | 39.3 | 1.90 | 22.2 |
| | | 0.94 | 51.2 | 1.52 | 1.7 |
| | | 0.63 | 44.9 | 1.68 | 4.0 |
| | | 0.55 | 42.0 | 1.76 | 4.5 |

TABLE 7-continued

COMPARISON OF SILICONE-TREATED RAW RELEASE PAPERS

| Paper (62 g/m²) | Silicone system | Silicone layer g/m² | Luster (75°) % | Micro-roughness (PPS) μm | Color index, ΔY (methylene blue, 60 s) |
|---|---|---|---|---|---|

A - Classic type
B - Pigment-coated with Al(OH)$_3$-mixture (I/II = 50/50%)
C - Pigment-coated with clay mixture
B,C - Pigment/binder ratio 1:0.44 (solid), coating layer, about 6 g/m²

TABLE 8

COMPARISON OF SILICONE-TREATED RAW RELEASE PAPERS

| Paper (62 g/m²) | Silicone system | Silicone layer g/m² | Releasing force (low speed) | | |
|---|---|---|---|---|---|
| | | | TESA 4154 cN/4 cm | TESA A 7475 cN/2 cm | TESA K 7476 cN/2 cm |
| A (Standard) | Emulsion (11.6%) | 0.96 | 10 | 16 | 35 |
| B | | 0.89 | 7 | 17 | 24 |
| | | 0.73 | 7 | 15 | 26 |
| A (Standard) | SF I | 0.80 | 5 | 22 | 18 |
| B | | 0.91 | 4 | 10 | 11 |
| | | 0.69 | 5 | 11 | 13 |
| | | 0.55 | 5 | 15 | 16 |
| C | | 0.60 | 9 | 18 | 56 |
| A (Standard) | SF II | 0.82 | 6 | 15 | 27 |
| B | | 0.94 | 4 | 8 | 16 |
| | | 0.63 | 5 | 12 | 19 |
| | | 0.55 | 6 | 13 | 22 |

A - Glassine type
B - Pigment-coated with Al(OH)$_3$-mixture (I/II = 50/50%)
C - Pigment-coated with clay mixture
B,C - Pigment/binder ratio 1:0.44 (solid) coating layer about 6 g/m²

What is claimed is:

1. Raw release paper for coating with a layer of dehesive silicone, the raw release paper comprising a pigment coating containing a binding agent formed on the paper, wherein the pigment coating contains aluminum hydroxide as a sole pigment or a pigment mixture with aluminum hydroxide as a main component, wherein the pigment coating is formed on the paper with a layer of from 3 to 10 g pigment coating/m² paper, and wherein the binding agent is present in a pigment/binder ratio of from 1:0.30 to 1:2.0 calculated with reference to solids.

2. Raw release paper according to claim 1, wherein the pigment mixture contains aluminum hydroxide of different particle-size distribution.

3. Raw release paper according to claim 1, wherein the binding agent is selected from the group consisting of starch derivatives, carboxymethylcellulose or polyvinyl alcohols and aqueous polymer dispersions based upon acrylic acid, acrylic acid esters, acrylonitrile, vinyl acetate, butadiene and styrene, alone or in mixtures.

4. Raw release paper according to claim 1, wherein the pigment coating is formed on a surface-sized paper.

5. Raw release paper according to claim 1, wherein the pigment coating is applied to both sides of the paper.

6. Release paper comprising the paper according to claim 1 coated with a releasing silicone coating.

7. Release paper comprising the paper according to claim 2 coated with a releasing silicone coating.

8. Release paper comprising the paper according to claim 3 coated with a releasing silicone coating.

9. Release paper comprising the paper according to claim 4 coated with a releasing silicone coating.

10. Release paper comprising the paper according to claim 5 coated with a releasing silicone coating.

* * * * *